United States Patent [19]

Matter et al.

[11] 4,015,098
[45] Mar. 29, 1977

[54] APPARATUS FOR MAKING INTERCELL CONNECTORS BY AN EXTRUSION-FUSION TECHNIQUE

[75] Inventors: Robert C. Matter, Anderson; Larry D. Spangler, Yorktown, both of Ind.

[73] Assignee: General Motors Corporation, Detroit, Mich.

[22] Filed: Nov. 12, 1975

[21] Appl. No.: 630,958

Related U.S. Application Data

[62] Division of Ser. No. 418,590, Nov. 23, 1970, Pat. No. 3,947,290.

[52] U.S. Cl. .................................. 219/90; 219/86; 219/119; 219/150 R; 219/152; 228/58; 228/901
[51] Int. Cl.² .................................. B23K 11/10
[58] Field of Search .................. 219/78, 86, 90, 119, 219/149, 150 R, 151, 152, 158, 160, 161; 228/58, 901

[56] References Cited

UNITED STATES PATENTS

| | | | |
|---|---|---|---|
| 3,238,352 | 3/1966 | Kollmann et al. | 219/119 |
| 3,544,754 | 12/1970 | Buttke et al. | 228/58 X |
| 3,723,699 | 3/1973 | Allen | 219/78 |

*Primary Examiner*—Bruce A. Reynolds
*Assistant Examiner*—N.D. Herkamp
*Attorney, Agent, or Firm*—Lawrence B. Plant

[57] ABSTRACT

Improved extrusion-fusion-type intercell connectors and process involving: casting the plate strap lugs to be welded from a hypoeutectic lead-antimony alloy containing at least about 2 percent by weight antimony; initially extruding the lugs into contact through an aperture in a battery intercell partition, the contact area being between 15 and 75 percent of the area of the aperture; and gradually heating the lug extrusions through a softening stage, an antimony-rich-phase melting stage, and an antimony-lean-phase melting stage. Force applied by rapid-response, declining-force welding electrodes causes (1) the softened extrusions to reshape somewhat prior to melting, and (2) the antimony-rich-phase of the alloy to exude out of the welding zone filling voids in the aperture before any substantial melting of the antimony-lean-phase occurs. The resulting weld is dense (void-free), has an antimony-rich ring adjacent the aperture wall, and after rupturing, displays an indicator core useful for evaluating the welds made and monitoring the stability of the manufacturing process/equipment for making them.

2 Claims, 12 Drawing Figures

APPARATUS FOR MAKING INTERCELL CONNECTORS BY AN EXTRUSION-FUSION TECHNIQUE

This is a division of application Ser. No. 418,590, filed Nov. 23, 1973, now U.S. Pat. No. 3,947,290.

BACKGROUND OF THE INVENTION

This invention relates to the electrical resistance welding of lead-acid storage battery intercell connectors by the Extrusion-Fusion process described in United States Patent application Ser. No. 134,442 entitled "Through the Partition Connection Formed by an Extrusion-Fusion Technique" filed Apr. 15, 1971 in the names of Robert C. Matter and Donald K. Aldred, and assigned to the assignee of the present invention. More specifically, this invention improves that process by the use of particular welding conditions and lead alloys which combine to provide a reliable readily controllable manufacturing-scale process, and strong, substantially void-free intercell connectors. Moreover, this invention provides apparatus for carrying out the improved process.

Basically the Extrusion-Fusion process (Ser. No. 134,442) makes liquid-tight, low resistance, electrical connections between adjacent cells of a multi-cell lead-acid storage battery by: clamping two thick plate strap lugs tightly against an intercell partition having an aperture in it; squeezing two welding electrodes together through holes in the clamp to extrude lug metal out of the thick lugs into the aperture until contact is made therein; and passing welding current through the extruded metal to melt it and, under the continuing force of the electrodes, cause it to flow into any voids in the aperture while, at the same time, extruding more metal out of the lugs into the aperture until the aperture is packed full of lug metal. With the clamping and electrode forces still applied, the weld nugget is allowed to cool and solidify.

Among the problems with production-scale implementations of the Extrusion-Fusion process is assuring consistency from one weld to the next over an extended production run and to provide simple quality control techniques for monitoring the welding conditions and the product produced. Conventional non-destructive tests (e.g., air leak and IR drop) have not demonstrated sufficient sensitivity to detect poor quality welds and alert the operator that welding conditions should be corrected. The expression "welding conditions" is intended to include principally clamping force, electrode force and response (i.e., follow-through), welding current and welding time. One aspect of this invention relates to a reliable quality control tool for monitoring the welding conditions.

Another problem with production-scale implementations of the process is minimizing the variables affecting the process and insuring that the remaining variables (i.e., the welding conditions) are controllable and have sufficiently broad operating ranges that the process may be operated continuously for extended periods of time without requiring frequent corrections and adjustments. Another aspect of this invention solves this problem while at the same time it substantially eliminates the formation of voids in the weld and produces welds having exceptionally high torque test values.

An object of this invention is to provide a manufacturing-scale version of the Extrusion-Fusion process and apparatus for reliably carrying it out which: consistently produces strong, splatter-free, substantially void-free intercell connections over a sufficiently broad range of welding conditions to permit continuous operation with only occasional process monitoring by sample destruction; and produces a reliable, readily-observable indicator of the welding history of the connection and hence a manifestation as to whether welding condition adjustments are needed.

This and other objects and advantages of this invention will become more readily apparent from the detailed description thereof which follows and in which.

This invention comprehends cold extrusion to produce contact areas between 15 and 75 percent of the area of the aperture and the use of rapid-response electrodes coupled with a particular welding schedule involving gradually increasing the welding current to effect three distinct physical changes in the lug extrusions, (1) softening and reshaping, (2) antimony-rich-phase melting and (3) antimony-lean-phase melting. The expression "rapid-response" electrodes relates to the ability of the electrodes to instantaneously and forcefully follow-up any yielding of the lugs as their physical properties change. A preferred embodiment provides the rapid-response with declining-force electrodes and increasing-force clamping. The term declining force electrodes relates to gradually lessening the force applied by the electrodes as the lead alloy softens and melts. The term "increasing-force" clamping relates to the gradual increase of clamping force as the lead softens and melts.

At the welding station, the lugs are clamped tightly against the partition wall and a portion of them cold extruded to contact within the aperture in the partition (see FIG. 5) to produce an initial contact area between 15 and 75 percent of the area of the aperture. The size of the contact area affects the initial contact resistance which in turn affects the amount of heat energy initially dissipated in the weld. Following contact in the aperture, the welding current is turned on and gradually built up to its maximum level. This technique of gradually increasing welding current is known in the resistance welding art as "upsloping", and with this technique both the initial and final current levels can be varied to provide an almost infinite current rise pattern. We prefer to upslope constantly throughout the welding cycle. Combinations of "upslope and hold" or "upslope and downslope" may also be used, but seem to offer no particular advantages yet require more controls. For constant upslope modes, we prefer a welding time of at least 3 cycles and no more than about eleven cycles. Below 3 cycles, the effects of upsloping are lost and above eleven cycles, heat distortion of the plastic partition is evident. Welding times of five to seven cycles are most preferred.

Figure 6:
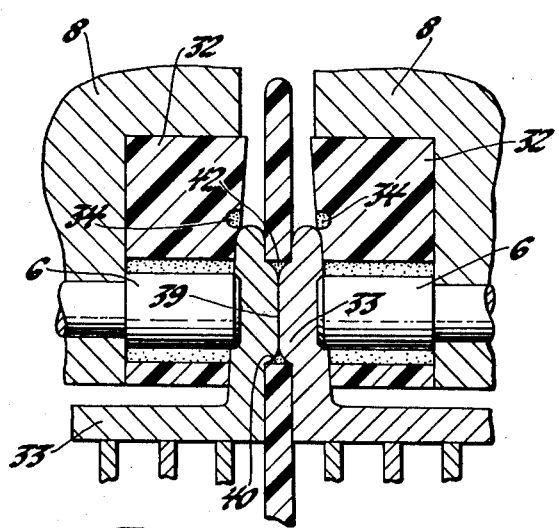
FIG. 6 is an enlarged, sectional front elevation view of a portion of the tool and illustrates the condition of the parts after the initial passing of current and extrusion, but before fusion commences.

As a result of the upsloping of the welding current, the lug extrusions slowly heat, soften and, under the applied electrode force extruding more lug into the aperture, enlarge somewhat to more completely fill the aperture just before melting commences (see FIG. 6). At the same time, the junction between the lug extrusions grows area-wise thereby reducing the contact resistance of the junction. Some void volume still remains in aperture, principally in the form of a ring surrounding the junction and adjacent the aperture wall. The current continues to build putting more heat into the extrusions and the temperature at the junction continues to build until it eventually exceeds the melting point of the antimony-rich-phase of the alloy. The fine grains of the antimony-rich-phase quickly melt and under the unrelenting applied force of the rapid-response welding electrodes, the now liquid antimony-rich-phase exudes out of the weld zone into the remaining void spaces (see FIG. 7). The rapid-response electrodes ensure filling of the void space with the lower melting phase before any substantial melting of the high melting antimony-lean-phase occurs. Finally, the temperature near the center of the weld zone eventually reaches the melting point of the antimony-lean-phase remaining thereat and it too begins to melt and complete the bonding of the lug extrusions. The composition of the lug alloy is important to the extent that it must be such as to provide a sufficient amount of the lower melting phase to fill the voids left in the aperture under the forces applied and before there is any substantial melting of the lead-rich phase. The alloyants required to effect this, however, must be such as to keep the hardness of the lead alloy in a range which permits the cold formation of the aforesaid contact areas. The stepwise melting resulting from upsloping does not produce as high a liquid pressure in the aperture as would be the case where there was substantially simultaneous melting of the lug extrusions. As a result, there is less tendency for the metal to squirt out of the aperture at the forces required for void-free connections which do not leak through. The use of electrodes having a declining force application during welding further reduces the likelihood of splattering, as will be pointed out in more detail hereinafter.

The size of the bond formed between the high melting, antimony-lean-phase or center portion of the connection is used as an indication of the quality of the weld produced and the stability of the welding conditions. The size of this bond is observable after twisting the connector to failure by first anchoring one of the lugs and then rotating the other lug in the plane of the partition until the intercell connector ruptures (see FIG. 8). Since the antimony-lean bond is weaker than the antimony-rich bond, rupture substantially invariably occurs through the weak bond thereby exposing it in the rupture plane. The exposed, ruptured, weak bond appears as a distinct island on the faces of the ruptured connector. These islands of ruptured weakly-bonded alloy are hereinafter designated as the "indicator cores". The number of inch-pounds required to twist the connector to failure indicates the strength of the weld. A cold weld (i.e., insufficient heat energy) yields a large indicator core. Such connections normally have strengths of less than 50 inch-pounds and cores greater than 0.3 inch in diameter, based on a 0.4 inch diameter aperture/connection. Welds having indicator cores less than 0.3 inch in diameter are acceptable. The absence of cores indicates that the welds are either too hot and are therefore on the threshold of splattering, or have inadequate electrode follow-through tending to produce porous welds. By porous welds we mean a weld which when subjected to vacuum impregnation (2 mm Hg for 3 min.) with a fluorescent oil (e.g., Zyglo ZL-15 water-wash penetrant sold by Magnaflux Corp.) and black light observation of the fractured sample will show no substantial penetration of the oil into the weld zone. Porous welds tend to create a joint which corrodes with time upon constant exposure to battery electrolyte. From a process control standpoint, a 0.1 inch diameter indicator core is selected as a reference point from which deviations can be measured to determine process stability. In other words, the process is set to produce 0.1 inch cores and deviations therefrom are used to determine which direction the process is drifting during the course of a run and where corrections should be made. The 0.1 inch core welds have strengths of about 75 inch-pounds torque shortly after welding. This, of course, will vary depending on the precise composition of the alloy used to make the connection and the amount of age-hardening experienced by the alloy after welding. If the core size is outside the control range of 0.1 - 0.3 inch, one or more of the welding conditions must be adjusted to bring the process back into line. Obviously, one could get cores smaller than 0.1 inch and still have excellent welds, but it means that the process is either approaching a hot-welding condition or a slowing of electrode response time that should be corrected before a number of batteries are subsequently assembled with substandard quality. Since welding and clamping forces are for the most part built into the machine and cumbersome to adjust, the core sizes can be controlled by varying only the electrical current variables. For example, the cores can be significantly decreased in size (e.g., from 0.3 inch diameter) by merely increasing the maximum current or slightly decreased in size by increasing the initial current. Similarly, the core sizes can be significantly increased in size by decreasing the maximum current and slightly increased in size by decreasing the minimum current.

As indicated earlier, the coupling of upslope welding with hypoeutectic lead-antimony alloys containing at least about 2% Sb and rapid electrode response results in the production of welds which are substantially void-free and have high strengths (i.e., above about 50 inch-pounds). This apparently results from the redistribution of the antimony in the aperture that occurs during welding. As indicated, the lower-melting, antimony-rich lead migrates to the outside of the weld zone immediately on melting where it forms a ring of metal which is stronger than the antimony-lean center. Not only is this ring comprised of a stronger material but it occupies a substantial portion of the cross-sectional area of the weld and, more importantly, the portion which is subjected to the most stress is usage. Moreover, the antimony-lean center has a higher melting point than the antimony-rich outer ring thus resulting in a directional solidification from the center of the weld radially outward — the exact opposite of what occurs when there is no redistribution of antimony. This directional solidification contributes significantly to the void-free structure of the intercell connector produced by this process as no shrinkage cracks or voids are trapped in the center of the weld to weaken it or become a site for future failure due to corrosion. A still further advantage here is that only the lower melting antimony-rich metal contacts the aperture wall resulting in less heat distortion thereof during welding. This is a particular advantage in those situations where there is severe misalignment of the electrodes with the aperture as there is less tendency for the plastic to squirt into the aperture. Lastly, the lower melting antimony-rich ring has less tendency to dissolve metal from the lug at the edges of the aperture resulting in a much less tendency for lead splatter or expulsion to occur along the partition-lug interface.

The way in which the force is applied to the electrodes and hence the lugs is a significant variable in this process. In this regard, the force should be instantaneously and constantly applied to follow up the lead mobility as the lug advances through its several physical changes, i.e., softening, first stage melting and second stage melting. Without it the antimony-rich alloy is not quickly moved to the partition wall before the antimony-lean material fuses. This requisite instantaneous availability of force is not provided by a conventional pneumatic or hydraulic cylinder alone as there is a momentary lag between electrode movement in response to the yielding of the lug and the reestablishment of the pressure in the cylinder. In the few cycles (60 cycles/sec.) when these physical changes are occurring, even momentary loss of significant electrode force results in poor quality welds. We have found that incorporation of springs (e.g., Belleville springs, urethane pads, etc.) intermediate the hydraulic cylinder and the welding electrodes provide the requisite rapid-response electrode follow-through. These springs shall hereinafter be referred to as the force-follow-through springs. We prefer to use Belleville springs since they have a flatter spring rate curve over the distances involved here. The precise amount of force required for each application will vary with the composition and age of the lead, the size of the aperture, the size of the extruding electrode, and the amount of current and upslope being used. In general, though, too little force can cause porosity or voids through which electrolyte can travel from one cell to the next and too much force can damage the parts and the tools. To make connectors using this system, the system is "locked-up" at the time the initial cold extrusion is made and all subsequent force applied to the clamps and electrodes comes from the force-follow-through springs which are compressed during the locking up. In the preferred embodiment shown in the drawings, the clamping members are urethane pads circumscribing the electrodes which compress during lock-up and subsequent follow-through of the electrodes and exert a counter force against the force-follow-through springs which increases as the force-follow-through springs expand. The net effect is that the clamping force increases and the electrode force decreases as the electrodes move together rapidly following the physical changes in the extrusions. This permits higher clamping force on the lugs and reduced hydraulic force on the molten metal which in turn reduces the likelihood of splatter or blow-out.

During welding, force on the parts comes from two sources, the force-follow-through springs and the force applied by the clamping means. In the preferred form of tooling for carrying out this invention, the clamping means are affixed to the electrode holders and are themselves spring-biased members circumscribing the welding electrode. In the most preferred form of tooling, the clamping means is a block or pad of compressible, high density polyurethane. The clamping forces need only be sufficient to prevent lead splattering or expulsion at a given current. In general the force required increases as the welding current increases. In the preferred system having force-follow-through springs and compressible clamping springs circumscribing the electrode, the strength of the force-follow-through springs must exceed that of the clamping springs sufficiently to overcome the counter force exerted by the clamping springs. In this regard, experience indicates that the force-follow-through springs should be capable of exerting at least about four times the force as the clamping springs and preferably at least about six times the force as measured with the welding gun in a closed or locked-up condition. It has been observed that high follow-through forces promote porosity (i.e., leakable voids) and require more electrical energy for comparable welds and that low follow-through forces require less clamping force and less energy for comparable welds.

In the most preferred system having a urethane pad as the clamping means, it has been observed that the relationship between the size of the electrode and the size of the aperture is important, primarily in terms of minimizing case warpage or distortion. This relationship also effects the quality of the weld. We have observed that when the ratio of the electrode diameter to the hole diameter is less than about 0.62 or more than 0.78, there is unacceptable partition distortion or poor welds.

Figure 1:
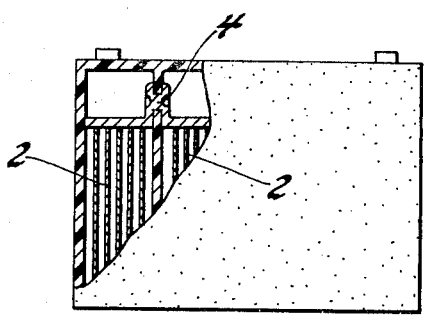
FIG. 1 is a partially sectioned front elevational view of a battery made in accordance with this invention.
Figure 2:
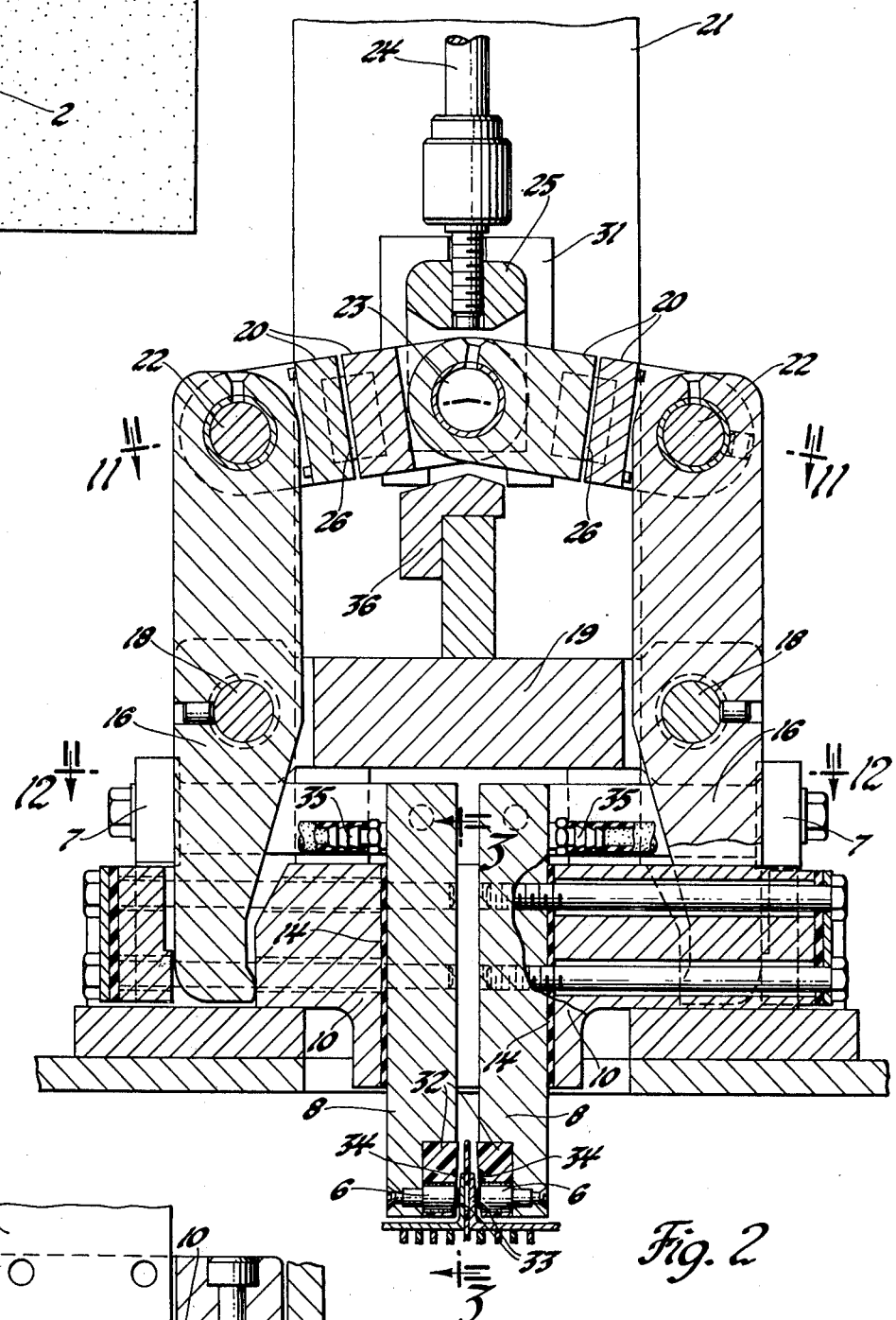
FIG. 2 is a sectioned, front elevational view of a tool used in the process and the positioning of the parts at the initial stage of the process.

With respect to the drawings, the several Figures show the preferred tooling and illustrate the several stages involved in carrying out the process. FIG. 1 illustrates a battery having cell groups 2 in separate cells of the battery and a through-the-partition intercell connection 4 electrically joining the positive plates of one cell group to the negative plates of the next adjacent cell group. FIGS. 2, 3, 11 and 12 show the preferred tooling for carrying out the process, description of which assists in better understanding this invention. The tooling Figures show a toggle gun welder for making one intercell connection. In actual practice, however, additional tools would be so arranged as to simultaneously weld several or all (five in the case of a 12V battery) of the intercell connectors. As best shown in FIG. 2, opposing electrodes 6 are fixed to copper electrode holders 8 which in turn are affixed to slides 10 which slide horizontally in guides 12. Electrical energy is supplied to the electrodes 6 via connection 7 to an appropriate source, e.g., transformer (not shown). Electrical insulation 14 (e.g., cloth reinforced phenolic resin) is provided as required to insulate the holders 8 from the slides 10 and hence the remainder of the tooling. The electrode holders 8 are moved toward and away from each other as the slides 10 move in response to the action of lever arms 16 which pivot about pins 18 affixed to a portion 19 of the frame 21 of the apparatus and cam the slides 10 to-and-fro. The lever arms 16 are themselves driven by two-part actuator arms 20 joined thereto by pivot pins 22 and joined to each other in a toggle joint 23 at the output shaft 24 of a hydraulic cylinder (not shown). An inverted U-shaped coupling 25 connects the output shaft 24 to the toggle joint 23. The outboard ends 27 of the pin in the toggle joint 23 are carried in bronze bearings 29 which slide up and down in guides 31. Force-follow-through springs 26 (e.g., Bellevilles) are positioned between each of the two parts of the actuator arms 20, as shown. The Bellevilles 26 are centered by guide pins 28 and their compression adjusted by means of washer-like shims 30.

Figure 3:
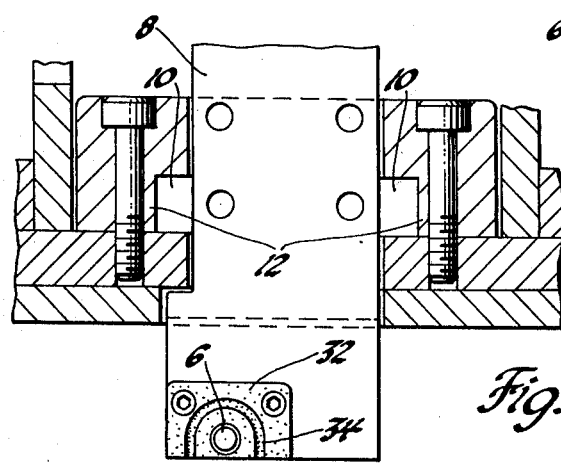
FIG. 3 is a partial sectioned view in the direction 3—3 of FIG. 2 showing a face of one electrode.

High density polyurethane pads 32 are provided around each of the electrodes 6 and serve to clamp the lugs 33 tightly against the walls of the intercell partition during the extrusion, fusion and cooling steps. The ends of the electrodes 6 protrude slightly (e.g., about 0.01 inch) out from the face of the pad so that piercing of the lugs 33 occurs slightly in advance of the clamping action of the pads 32. This reduces some of the force otherwise required to effect the additional amount of compression of harder pads 32 during welding. For softer pads 32, the electrode 6 may be flush with the face of the pads 32 or even depressed beneath the face depending on the overall force balance in the system. A groove 34 is provided in the face of each of pads 32 and conforms, shapewise, substantially to the shape of the lugs 33 as best shown in FIG. 3. The width and depth of the groove 34 as well as its closeness to the periphery of the lug 33, permits adjustment of the compressibility of and hence force applied by the urethane pads 32. The groove also lessens localized stress build-up in the pad and greatly increases the life thereof. The clamping face of the urethane pads 32 may have the same angle as the draft angle of the lugs 33 so as to apply uniform clamping force, but in the preferred form, the angle on the clamping face exceeds the draft angle of the lugs by 2° to 6° (4° preferred) in order to apply more force to the top of the lug than at the base thereof.

Electrode coolant enters the electrodes 6 via fitting 35 and flows through appropriate channels (not shown) in the electrodes 6. A particular advantage of the use of urethane pads 32 lies in the ability to harden or soften the pads slightly without changing them by merely changing the temperature and/or flow rate of the electrode coolant thereby providing another means of "fine tuning" the force system apparatus, if necessary.

Figure 4:
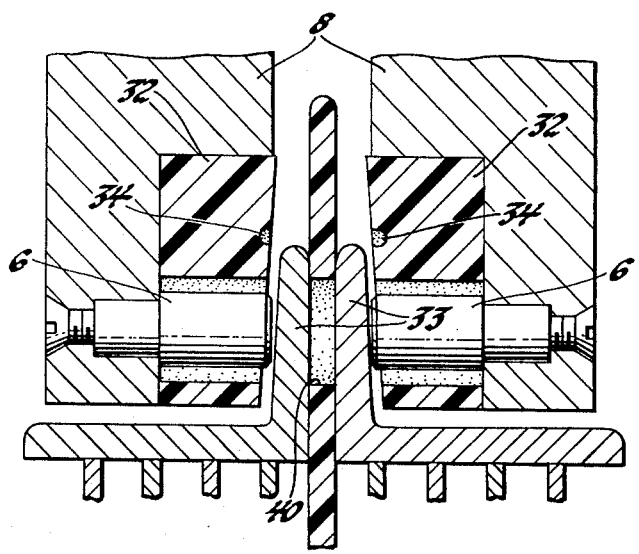
FIG. 4 is an enlarged sectional front elevational view of a portion of the tool of FIG. 2 and showing the position of the parts before actuating the tool.
Figure 5:
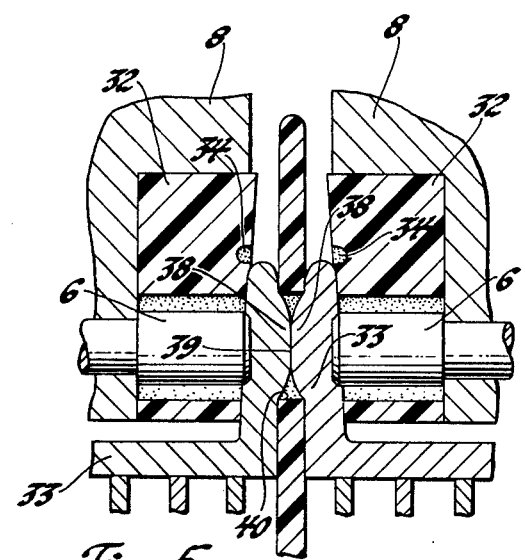
FIG. 5 is an enlarged, sectional front elevational view of a portion of the tool of FIG. 2 and illustrates the condition of the parts after the initial cold extrusion step of the process.
Figure 7:
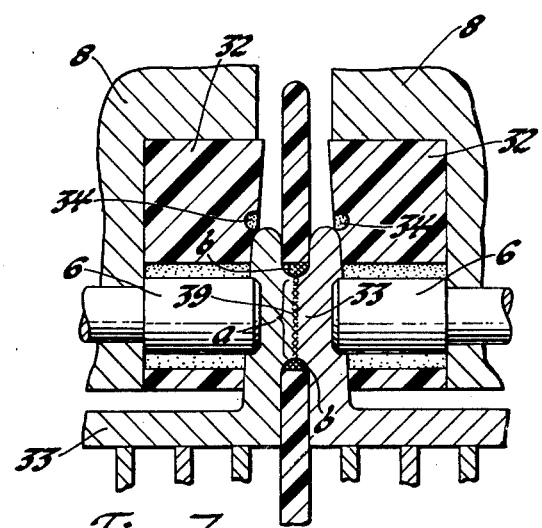
FIG. 7 is an enlarged sectional front elevational view of a portion of the tool and illustrates the condition of the parts at the end of welding (i.e., current passage)

In operation, the battery is positioned with the plate strap lugs 33 between the electrodes 6 as best illustrated in FIG. 4. When so positioned the hydraulic cylinder is actuated driving the output shaft 24 thereof completely downward until it bottoms out against stop 36. At this time, the follow-through-springs 26 (i.e., Bellevilles) compress and "bottom out" the enclosing pads completely, and the system is thus "locked up" with the initial cold extrusion taking place as best illustrated in FIG. 5. FIG. 5 shows lug extrusions 38 pushed out from the lugs 33 and meeting in the aperture 40 in the intercell partition. The flattened interface area 39 formed between the extrusions 38 comprises about 15 to 75 percent of the area of the aperture 40. The now-compressed follow-through-springs 26 are ready to provide the source for the quick follow-through force required by the system. Next the welding current is turned on and gradually increased to its maximum level. The lug extrusions 38 heat up, soften, and under the force applied by the springs 26, flow somewhat to more completely fill the aperture 40 with the soft but still solid metal as best illustrated in FIG. 6. At this point, some void volume in the form of an annulus or ring 42 remains in the aperture around the lug extrusions 38 and adjacent the wall of the aperture. Almost immediately after softening, the ever increasing current raises the temperature of the lug extrusions 38 at their interface 39 to the melting point of the antimony-rich-phase of the alloy and this phase melts. Upon melting and under the instantly available applied force of the follow-through-springs 26, the Sb-rich phase exudes out of the center of the weld zone and into the annular voidspace 42 before any substantial melting of the antimony-lean-phase occurs. This results in the formation of an antimony-rich annulus (b) [FIG. 7] in the previously void space 42 and an antimony-lean center portion $a$ [FIG. 7]. During the remainder of the welding cycle, the Sb-lean center portion $a$ heats to its melting point and fusion bonding of the center portions finally occurs. The antimony-lean region $a$ of FIG. 7 is weaker than the antimony-rich region $b$, and since it is the last to melt, its size and/or degree of fusion is an indicator of what energy adjustments should be made to the system.

Figure 8:
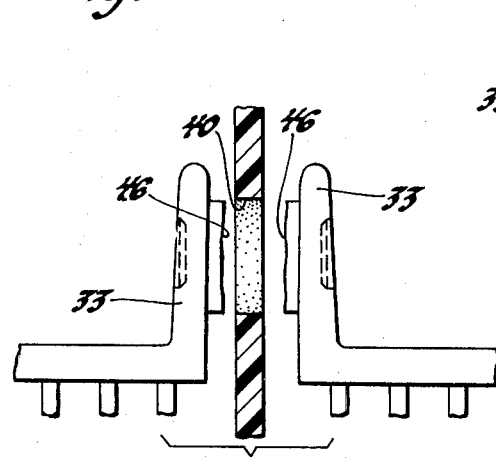
FIG. 8 illustrates the parts ruptured for observation in conjunction with the quality control aspect of the invention.
Figure 9:
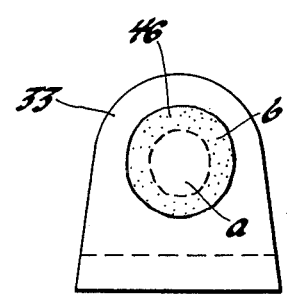
FIG. 9 illustrates an indicator core characteristic of a cold weld.
Figure 10:
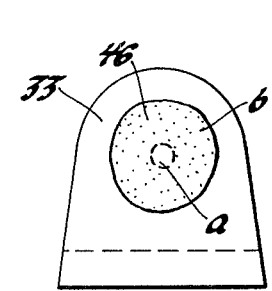
FIG. 10 illustrates an optimum indicator core size.
Figure 11:
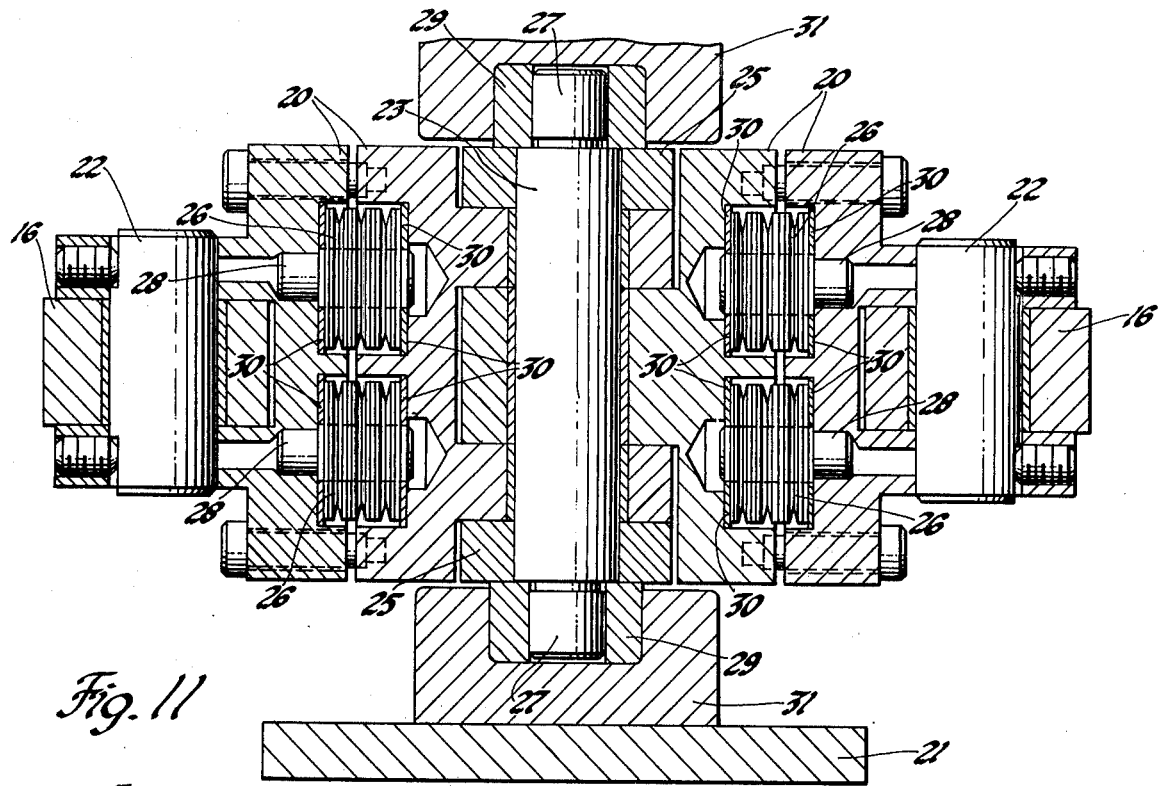
FIG. 11 is an enlarged partially sectioned, plan view in the direction 11—11 of FIG. 2 showing the drive linkage.
Figure 12:
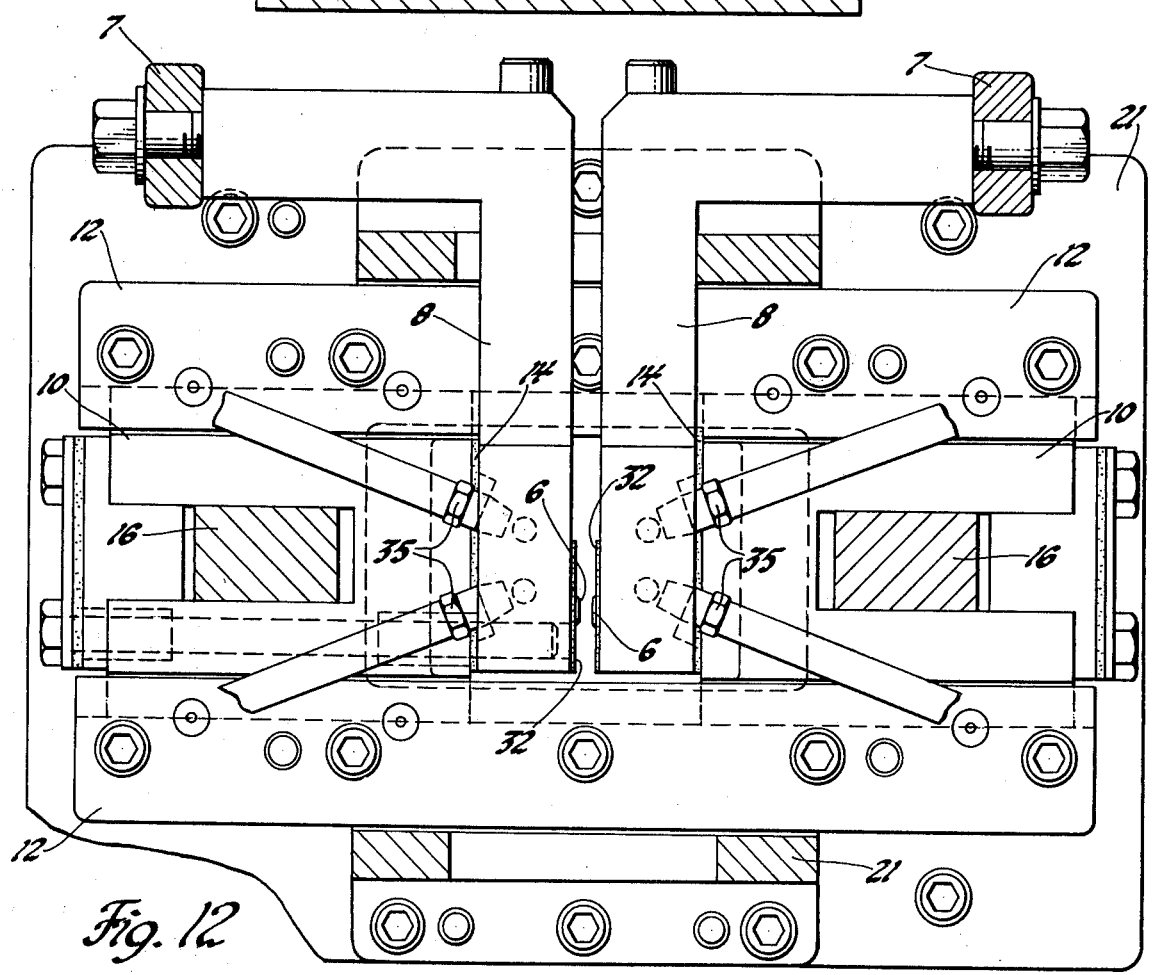
FIG. 12 is an enlarged partially sectioned plan view in the direction 12—12 of FIG. 2.

To monitor the process, an occasional battery is removed from the line and its connectors immediately twisted to rupture as illustrated in FIG. 8. Rupture 46 will always occur through the region $a$ where the bond is weakest and which was the last to melt. The size (i.e., diameter) of this last-to-melt portion $a$, as seen on the rupture faces 46 (FIGS. 9 and 10), indicates whether the welding conditions require adjustment to bring the process back into line. In this regard, a large indicator core $a$ (FIG. 9) dictates increasing the energy to reduce the core size to that shown in FIG. 10. If there is no core showing, energy should be reduced to produce a core like that shown in FIG. 10 which serves as a "bench mark" indicator from which to make corrective judgments. A variation of the indicator-core test allows the connection to age for about four hours until the center/core hardens to a degree stronger than the unfused lug metal. Well fused connections will then fracture along the interface between the unfused metal and the recrystallized metal, but low power, poorly fused metal will still fail through the core. When aged, fractures display cores in excess of about 0.2 inch diameter, increased power is called for.

In one specific example of the invention plate strap lugs were cast to a thickness of 0.215 inch with a 2° draft angle on the back side of the lugs and from an alloy comprising, by weight, 3% Sb, 0.2% Sn, 0.0005% S, 0.2% As and the balance principally lead. The lugs were positioned on both sides of an intercell partition comprising an ethylene-propylene copolymer, having a thickness of 0.070 inch and an aperture 0.4˝ inch in diameter. The welding electrode had a diameter of 0.312 inch and was surrounded by a urethane clamping pad having a 0.402 inch diameter hole through it for the electrode. The clamping pad comprised vacuum degassed polyurethane having a Shore "D" hardness of 42 – 47 and a clamping face angle of 4° (a 2° mismatch with the part). Follow-through Belleville springs were selected so as to provide about 1060 lbs. force on the electrodes and 200 lbs. clamping force in the urethane pads at the start of welding and about 560 lbs. force on the electrodes and 360 lbs. force on the pads at the end of welding for a net followthrough force exerted by the Bellevilles on the electrodes of about 340 lbs. during welding. After the initial extrusion, the current was gradually fed to the parts over a total welding period of 6 cycles starting with about 25% initial current and finishing with about 78% maximum current for the equipment used. The welder was a 25 KVA unit set so as to have an open circuit voltage of 8.2 volts and closed circuit voltage of about 1.5 – 2.5 volts which, of course, increased throughout the upsloped weld cycle. The current varied from about 4,200 amps initial to about 14,000 amps maximum. Under these conditions, rapid electrode movement was experienced between the third and sixth welding cycles followed by a flattening of the electrode movement trace after the current stopped and during the remainder of the welding hold cycle. The weld produced had an indicator core size of about 0.15 inch and torque tested at about 65 inch-pounds.

While we have disclosed our invention primarily in terms of specific embodiments thereof, we do not intend to be limited thereto but rather only to the extent hereinafter set forth in the claims which follow.

We claim:

1. A welding gun for working in the narrow confines of adjacent cells of a lead-acid storage battery and for therein extruding lead alloy from plate strap lugs into an aperture in a partition separating said adjacent cells and then melting said alloy to completely fill said aperture with the alloy, said gun comprising:
    a pair of opposing substantially cylindrical plunger-electrodes adapted to move toward each other to extrude alloy from said lugs into said aperture and thereafter supply electrical current to said extruded alloy to soften and melt it in the aperture;
    a compressible lug-clamping means surrounding each of said plunger-electrodes and adapted to engage said lugs and hold them against said partition during said extrusion and melting;
    a pair of opposed plunger-electrode holders each carrying one each of said plunger-electrodes and clamps and adapted to non-interferingly extend into said adjacent cells and therein coact with each other in a pincer-like motion to cause clamping of said lugs tightly against the partition surrounding the aperture, extruding of alloy from said lugs into the aperture until contact therebetween is made therein and welding the contacting extrusions to form an intercell connector through said aperture; and
    means for forcefully driving said holders together, said driving means including a compressible means for storing rapidly-expendable potential energy behind said plunger-electrodes for immediate release to said plunger-electrodes as said electrical current is supplied.

2. A welding gun for working in the narrow confines of adjacent cells of a lead-acid storage battery and for therein extruding lead alloy from plate strap lugs into an aperture in a partition separating said adjacent cells and then melting said alloy to completely fill said aperture with the alloy, said gun comprising:
    a rigid supporting frame;
    a pair of opposing substantially cylindrical plunger-electrodes adapted to move rectilinearly toward each other to extrude alloy from said lugs into said aperture and thereafter supply electrical current to said extruded alloy to soften and melt it in the aperture;
    a compressible pad of high density polyurethane surrounding each of said plunger-electrodes and adapted to engage said lugs and hold them against said partition during said extrusion and melting;
    a pair of opposed plunger-electrode holders each carrying one each of said plunger-electrodes and pads and adapted to non-interferingly extend into said adjacent cells and therein coact with each other to cause clamping of said lugs tightly against the partition surrounding the aperture, extruding of alloy from said lugs into the aperture until contact therebetween is made therein and welding of the contacting extrusions to form an intercell connector through said aperture;
    slide means on each of said holders for imparting rectilinear motion to said holders toward and away from each other;
    a pair of lever arms having slide-driving ends engaging and slide means and adapted to urge said slides toward and away from each other, and force-application-ends for connection to a motive power source, said levers being pivotally mounted to said frame between said ends; and
    a toggle joint between and joined to said force-application-ends and adapted for coupling to said power source, each arm of said toggle joint including a spring adapted to be compressed when force is applied to the lever arms by the toggle to thereby store rapidly-expendable potential energy behind said plunger-electrodes for release to said plunger-electrodes as said electrical current is supplied.

* * * * *